Oct. 27, 1959 A. R. RUTH 2,909,795
CLEANING TOOL FOR AIR LINE HOSE COUPLING
Filed Feb. 24, 1958
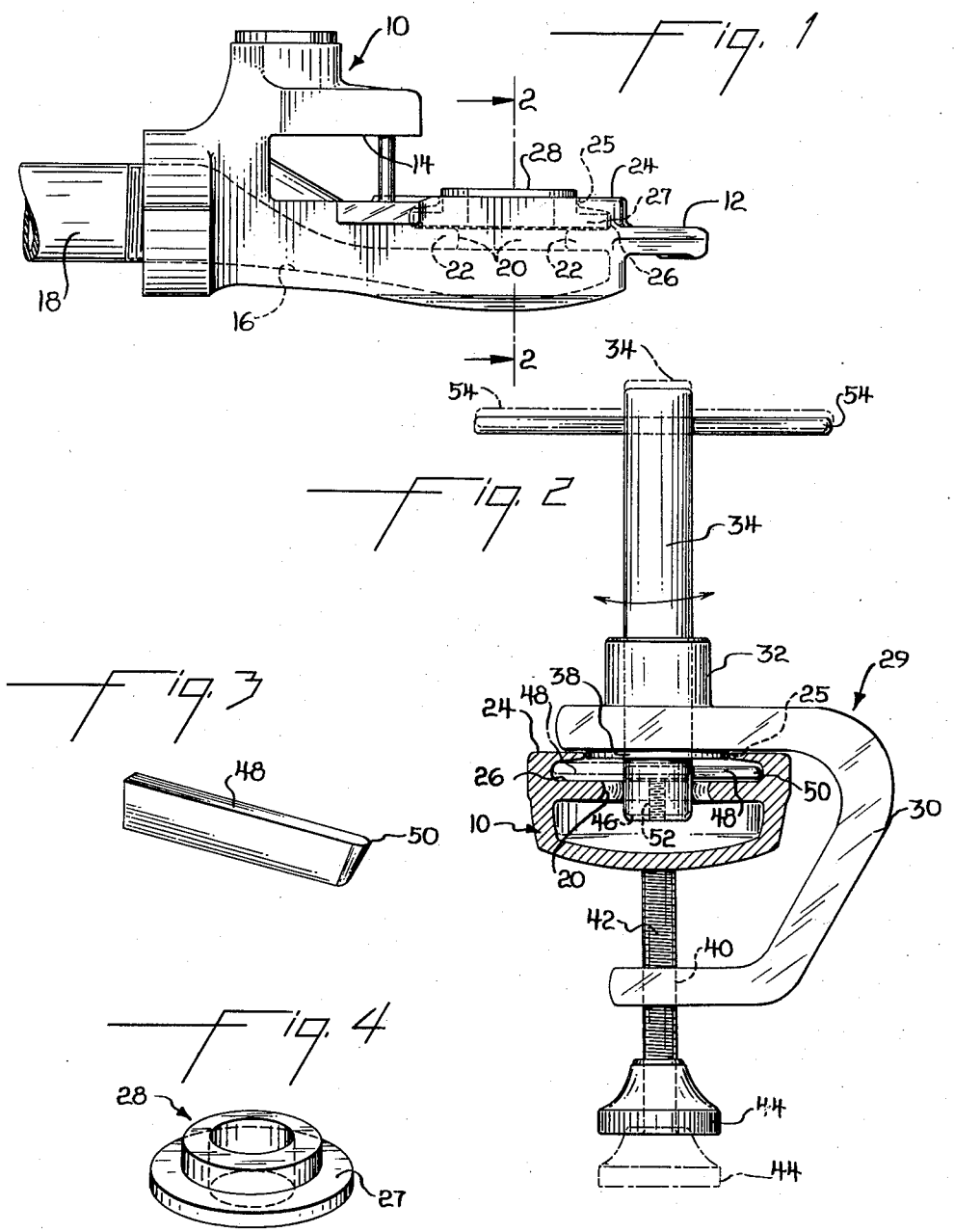
INVENTOR.
ACQUILLA R. RUTH, Deceased
Thelma M. Ruth, Executrix
BY
ATTORNEY

United States Patent Office

2,909,795
Patented Oct. 27, 1959

2,909,795

CLEANING TOOL FOR AIR LINE HOSE COUPLING

Acquilla R. Ruth, deceased, late of York, Pa., by Thelma M. Ruth, executrix, York, Pa.

Application February 24, 1958, Serial No. 717,233

6 Claims. (Cl. 15—104.02)

This invention relates to an improvement in a cleaning tool for the hose coupling of an air line of the type used on automotive and railway vehicles. More particularly, the cleaning tool is for purposes of cleaning an annular groove in said coupling which receives a circular, flanged rubber sealing washer which requires replacement on occasions.

The air transmitted through conventional air hoses and other types of delivery lines on automotive and railway vehicles sometimes entrains various quantities of moisture and liquid such as water. This material causes a certain amount of sediment to accumulate in the couplings and rust also is created to a certain degree. For purposes of providing adequate sealing between a mating pair of such coupling members, a compressible washer formed from rubber or the like is mounted in a suitable annular groove provided in each coupling, said rubber washers engaging each other when a pair of mating coupling members are connected.

The annular groove which receives the flanged rubber washer referred to above also is subject to the accumulation of sediment and other extraneous material, as well as rust, whereby when said rubber washer becomes worn to a degree where it requires replacement, the old washer is readily removed from the groove but it is found that, upon inserting a new washer, the substantial annular flange thereon is obstructed from proper seating within the annular groove due to the accumulation of rust, sediment and the like therein. Because of the peculiar shape of the annular groove, it is practically impossible to clean the same readily with conventional tools of a service depot where such coupling members are inspected and serviced periodically.

It is the principal object of the present invention to provide a simple, readily attachable, and easily operated tool which is connectable quickly to a coupling of the type referred to and a cleaning member comprising part of the tool is disposed within the annular groove of the coupling and may be rotated and moved axially of the annular groove for purposes of removing effectively and substantially completely from said groove all extraneous material such as sediment and rust.

Another object of the tool is to provide aligning means thereon, whereby the tool quickly and accurately is aligned axially of said annular groove and the outer opening which is coaxial therewith, whereby as the tool is rotated and the cleaning member contacts the walls of the annular groove, all of such walls will be contacted uniformly thereby.

A further object of the invention is to provide on the tool a scraping blade which is detachably connectable to the tool and also is adjustable to compensate for wear upon the cutting member.

Still another object of the invention is to provide not only a simple tool of this type but one which is capable of relatively inexpensive manufacture and is durable so as to experience long life even though it is used rather ruggedly.

Details of the foregoing objects and of the invention, as well as other objects thereof, are set forth in the following specification and illustrated in the accompanying drawing comprising a part thereof.

In the drawing:

Fig. 1 is a side elevation of an exemplary air line hose coupling of the type adapted to be cleaned by the tool embodying the present invention.

Fig. 2 is a side elevation of a cleaning tool for said air line hose coupling and embodying the principles of the present invention, the tool being shown mounted in operative relationship with such coupling which is shown in vertical sectional view taken on the line 2—2 of Fig. 1.

Fig. 3 is a perspective view of an exemplary cleaning and cutting member or blade of the preferred type used with said tool shown on a larger scale than used in Figs. 1 and 2.

Fig. 4 is a perspective view of an exemplary rubber washer of the type carried by the coupling member and shown on a larger scale than used in Figs. 1 and 2.

Referring to Figs. 1 and 2, the coupling 10 to which the present invention is applicable for cleaning the same comprises a casting having an integral projection 12 at one end thereof which is slidable against a complementary surface 14 on the other coupler when two of such couplers are connected together. An interior air passage 16 is formed within the coupling and this communicates with a pipe or air hose 18 to which the coupling 10 is connected at one end.

The coupling 10 also is provided with an interior diaphragm or partition having a central circular aperture 20 therein, said aperture communicating with the interior air passage 16. The upper surface 24 of the coupler 10 also has a central aperture 25 which is coaxial with aperture 20 and an annular seat 26 is formed within the body of the casting between the openings 20 and 25 and likewise is coaxial therewith. The seat 26 is complementary to an annular flange 27 of a circular flexible washer 28, which may be formed of rubber or similar suitable material. The upper surface of the washer 28 projects preferably slightly above the upper surface 24 of the coupling when the washer is seated properly with its flange 27 disposed within the annular seat 26. However, when a pair of such couplings are connected, the upper surfaces of the respective washers 28 in each coupling will abut each other and are coaxial, whereby the washers will be compressed against each other to effect a tight air seal between the connected couplings.

When a washer 28 becomes worn and requires replacement, the worn washer readily can be probed, by using a screw driver or the like, from the seat 26 but it is found that the walls of the seat 26 usually are rough and uneven due to the accumulation of rust, sediment deposits, and the like. The conventional manner of mounting a new washer 28 within the annular seat 26 is to compress the opposite sides of the washer and project one portion of the flange 27 into the seat at one side, and then gradually work the remainder of the flange 27 completely into the annular seat 26. The accumulated rust and sediment normally occurring in the seat following the removal of a worn washer however resists the ready placing of the flange 27 within the seat 26. As a result of this, especially when a workman is endeavoring to make such replacement quickly, many instances have been known to exist where the washers are improperly seated within the annular seat 26 and defective sealing of the air line results.

Cleaning the annular seat 26 by conventional tools is unsatisfactory and an adequate cleaning thereof is practically impossible. Expedients such as pieces of wire, bent nails, and the like have been resorted to but ineffectively. Accordingly, the present invention was devised to provide a tool specifically designed to clean the annular seat 26 by uniformly scraping all of the walls defining the same quickly and effectively to remove the accumulated rust, sediment and the like therefrom, whereby smooth surfaces are provided which readily receive the flange 27 of the washer 28.

The exemplary tool 29 illustrated in its preferred embodiment in Fig. 2 for accomplishing such cleaning operation comprises a substantially C-shaped frame 30 which may be formed inexpensively by casting from suitable metal which preferably is of light weight and durable, such as aluminum. The invention is not to be restricted however to being formed from said specifically recited material. The frame 30 is provided at one end with a bearing boss 32 having an axial bearing opening therethrough, said bearing opening also extending through the leg of the frame 30 to which the boss 32 is connected, for purposes of both rotatably and axially supporting a rod or shaft 34, for purposes to be described.

In order to align the frame 30 with the coupling 10 so that the shaft 34 will be coaxial with the annular seat 26, as well as the openings 20 and 25 in the coupling, the frame 30 also is provided with a short circular boss 38 which is complementary to and is received within the central aperture 25 of the coupling 10. The boss 38 is axially opposite the bearing boss 32 and the inner end of shaft 34 extends therethrough into the coupling 10, as clearly shown in Fig. 2.

The inner surface of the upper leg or arm of the frame 30, as viewed in Fig. 2, flatly abuts the upper surface 24 of the coupling 10 when the circular boss 38 is received within the opening 25. In order to hold the frame 30 in this position, the opposite leg of the C-shaped frame 30 is provided with a threaded aperture 40 within which a clamping screw 42 is threaded so as to be coaxial with the shaft 34. A suitable enlarged turning knob 44 is formed on the lower end of clamping screw 42 and, when the upper end of screw 42 is moved into firm engagement with the lower surface of coupling 10, the frame 30 will be anchored, detachably, in operative position upon the coupling 10.

A short distance inward from the lower end of shaft 34, a transverse opening is formed for purposes of receiving one end of a scraping and cutting blade 48 which preferably is formed from tool steel and is similar to the type of cutting blades used in machine shops for cutting metal. Such blades are capable of long life and the outer ends thereof comprise a cutting tip 50 which, from time to time, is sharpened as needed. The cutting blade 48 is secured within the transverse opening 46 by a set screw 52 which may be of the headless type but having an Allen socket in the outer end thereof for purposes of loosening and tightening the set screw 52 and thereby securing the cutting blade 48 in operative position when the set screw 52 is tightened. Adjustment of the blade 48 also might be achieved by loosening the set screw and subsequently tightening it.

The upper end of shaft 34 has a transverse bar or handle 54 extending therethrough and by which the shaft 34 is both rotated and moved axially to insure the cleaning of both the upper and lower surfaces of the annular seat 26 by the cutting blade 48, such motion being indicated by the full and dotted line positions of the handle 54 as well as the full and dotted line positions of the cutting blade 48 in Fig. 2.

Mounting the tool 29 upon the coupling 10 is accomplished by backing off the clamping screw 42 so that the inner end of shaft 34 and blade 48 may be disposed within the annular seat 26 and also the circular boss 38 is disposed coaxially with upper opening 25. Clamping screw 42 then is tightened against the lower surface of coupling 10 and the tool is ready for operation. Removal of the tool from the coupling is accomplished by reversing this procedure and loosening screw 42 so as to permit the removal of the cutting blade 48 from the annular seat as well as the entire removal of the tool from the coupling. Following this operation, the accumulated extraneous material which has been scraped and cut from the annular seat 26 then is either shaken or blown from the coupling and a new washer 28 readily may be seated properly within the coupling by disposing the flange 27 thereof within the annular seat 26. The fitting of the flange within said seat takes place quickly and easily when the surfaces of the seat are cleaned as described above.

From the foregoing, it will be seen that the present invention provides an inexpensive, rugged and durable tool for cleaning the interior annular seat of an air line hose coupling completely and effectively incident to replacing the rubber sealing washer within said coupling. The tool is small in size and readily may be carried within the pocket of a service man either at a railway station or a truck terminal. The tool may be mounted upon a coupling within a very few seconds of time and likewise equally quickly removed therefrom at the completion of a cleaning operation.

While the invention has been described and illustrated in its preferred embodiment, and has included certain details, it should be understood that the invention is not to be limited to the precise details herein illustrated and described since the same may be carried out in other ways falling within the scope of the invention as claimed.

I claim:

1. A tool for cleaning an annular interior gasket receiving seat in a hose coupling for automotive and railway vehicles and the like having an opening extending coaxially outwardly from said seat and said coupling also having a wall opposite said opening, said tool comprising in combination, a C-shaped frame arranged to extend around one side of said coupling when mounted operatively thereon, one leg of said frame extending across said opening in said coupling and the other being spaced outwardly from said wall of said coupling opposite said opening, positioning means fixed to and projecting from one surface of said one leg of said frame and arranged to extend coaxially into said opening of said coupling and contacting substantially the entire perimeter thereof to position the frame relative thereto, said one leg also having a bearing opening extending coaxially through said fixed means and leg of said frame, shaft means supported by said one leg of said frame for free axial and rotational movements within the bearing in said one leg and fixed means, one end of said shaft means projecting toward said other leg of said frame and into said coupling through said opening, a tool blade carried by said end of said shaft and extending radially therefrom into said interior annular gasket receiving seat of said coupling, and clamping means carried by the other leg of said frame and extending toward said shaft means and substantially coaxial therewith and engageable with the exterior of the wall of said coupling opposite said opening to secure said frame detachably connected to said coupling.

2. The tool set forth in claim 1 further characterized by said clamping means comprising a screw threaded through said other leg of said frame and engageable at one end with said wall of said coupling to clamp said frame thereto.

3. The tool set forth in claim 1 further characterized by said positioning means comprising a circular boss complementary in size to the opening in said coupling which is to receive the same.

4. The tool set forth in claim 1 further characterized by said projecting end of said shaft having a radial opening therein extending transversely to the axis of said shaft and spaced inward from the outer end thereof, and a locking screw threadably extending substantially coaxially inward from the projecting end of said shaft and engaging said tool blade within said opening to secure the same in any desired operative position therein.

5. The tool set forth in claim 1 further including an operating handle connected to and extending transversely to the opposite end of said shaft to provide means by which said shaft and tool blade carried thereby may be moved operably relative to said frame and coupling when said frame is clamped to said coupling.

6. The tool set forth in claim 1 further including a bearing boss fixed to said one leg of said frame coaxially with said positioning means thereon and projecting from the surface of said leg opposite that from which said positioning means projects, the bearing within said bearing boss being of the same diameter as the bearing opening within said leg of said frame and coaxial therewith to receive said shaft means which carries said tool blade.

References Cited in the file of this patent

UNITED STATES PATENTS

| | | |
|---|---|---|
| 978,442 | Field | Dec. 13, 1910 |
| 1,069,286 | Pinkerton | Aug. 5, 1913 |
| 2,651,066 | Montgomery | Sept. 8, 1953 |